United States Patent
Van Riper et al.

(10) Patent No.: US 11,472,727 B2
(45) Date of Patent: Oct. 18, 2022

(54) COMBINATION ULTRAVIOLET RAY AND OZONE WATER SANITIZING UNIT

(71) Applicant: Hayward Industries, Inc., Berkeley Heights, NJ (US)

(72) Inventors: Dexter Richard Van Riper, Gilbert, AZ (US); Dominic Conn, Tempe, AZ (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 194 days.

(21) Appl. No.: 15/978,888

(22) Filed: May 14, 2018

(65) Prior Publication Data

US 2018/0354833 A1 Dec. 13, 2018

Related U.S. Application Data

(60) Provisional application No. 62/517,748, filed on Jun. 9, 2017.

(51) Int. Cl.
*C02F 9/00* (2006.01)
*C01B 13/10* (2006.01)
(Continued)

(52) U.S. Cl.
CPC ............... *C02F 9/00* (2013.01); *B01J 19/123* (2013.01); *C01B 13/10* (2013.01); *C02F 1/008* (2013.01);
(Continued)

(58) Field of Classification Search
None
See application file for complete search history.

(56) References Cited

U.S. PATENT DOCUMENTS 3,079,498 A 2/1963 Ruffin
3,336,099 A 8/1967 Czulak et al.
(Continued)

FOREIGN PATENT DOCUMENTS

CN 1147435 C 4/2004
CN 107973368 A 5/2018
(Continued)

OTHER PUBLICATIONS

Custom Molded Products LLC's (C-M-P.com) Powerclean Salt Ultra Installation manual, https://209462-636977-raikfcquaxqncofqfm.stackpathdns.com/wp-content/uploads/2018/11/Powerclean-Salt-Ultra-Instructions_SCREEN.pdf, downloaded Dec. 18, 2020 (Year: 2020).*

(Continued)

*Primary Examiner* — Chester T Barry
(74) *Attorney, Agent, or Firm* — McCarter & English, LLP

(57) ABSTRACT

A swimming pool water sanitizing unit with an ozone generator and a separate ultraviolet (UV) reactor chamber within the same housing unit. The ozone generator may include a water jacket gap between the ozone generator chamber and the outer casing that passes pool water through the gap for cooling. Either of the ozone generator and the UV reactor chamber may include UV intensity sensors to help predict the life of the UV bulb therein. The UV reactor chamber may include rotating water paddle blades to stir up the water within the chamber for enhanced exposure to the UV light. A diverter valve enables diversion of ozone enriched fluid to the pool pump in addition to the UV reactor chamber.

33 Claims, 10 Drawing Sheets

(51) Int. Cl.

| | | |
|---|---|---|
| C02F 1/00 | (2006.01) | |
| C02F 1/32 | (2006.01) | |
| C02F 1/78 | (2006.01) | |
| E04H 4/12 | (2006.01) | |
| B01J 19/12 | (2006.01) | |
| C02F 1/76 | (2006.01) | |
| C02F 103/42 | (2006.01) | |

(52) U.S. Cl.
CPC ............... *C02F 1/325* (2013.01); *C02F 1/78* (2013.01); *E04H 4/1209* (2013.01); *B01J 2219/1203* (2013.01); *C01B 2201/76* (2013.01); *C02F 1/76* (2013.01); *C02F 2103/42* (2013.01); *C02F 2201/326* (2013.01); *C02F 2201/328* (2013.01); *C02F 2201/3223* (2013.01); *C02F 2201/782* (2013.01); *C02F 2209/008* (2013.01); *C02F 2209/03* (2013.01); *C02F 2303/04* (2013.01); *C02F 2305/023* (2013.01)

(56) References Cited

U.S. PATENT DOCUMENTS

| | | | |
|---|---|---|---|
| 4,141,830 A | 2/1979 | Last | |
| 4,179,616 A | 12/1979 | Coviello et al. | |
| 4,230,571 A * | 10/1980 | Dadd | C02F 1/325 210/760 |
| 4,752,401 A | 6/1988 | Bodenstein | |
| 4,842,723 A | 6/1989 | Parks et al. | |
| 4,849,115 A | 7/1989 | Cole et al. | |
| 5,266,215 A | 11/1993 | Engelhard | |
| 5,302,298 A * | 4/1994 | Leitzke | A61L 2/10 210/748.15 |
| 5,422,487 A | 6/1995 | Sauska et al. | |
| 5,434,419 A | 7/1995 | Decupper | |
| 5,590,390 A | 12/1996 | Maarschalkerweerd | |
| 5,709,799 A * | 1/1998 | Engelhard | C02F 1/325 210/748.1 |
| 6,001,242 A | 12/1999 | England et al. | |
| 6,013,918 A | 1/2000 | Bushnell et al. | |
| 6,027,642 A | 2/2000 | Prince et al. | |
| 6,071,473 A | 6/2000 | Darwin | |
| 6,099,735 A | 8/2000 | Kelada | |
| 6,099,799 A | 8/2000 | Anderson | |
| 6,120,691 A | 9/2000 | Mancil | |
| RE36,896 E | 10/2000 | Maarschalkerweerd | |
| 6,125,778 A | 10/2000 | Rodden | |
| 6,129,850 A | 10/2000 | Martin et al. | |
| 6,132,629 A | 10/2000 | Boley | |
| 6,149,343 A | 11/2000 | Lewis et al. | |
| 6,171,452 B1 | 1/2001 | Michael | |
| 6,193,894 B1 | 2/2001 | Hollander | |
| 6,231,820 B1 | 5/2001 | Wedekamp | |
| 6,274,052 B1 | 8/2001 | Hartwig | |
| 6,299,761 B1 | 10/2001 | Wang | |
| 6,402,966 B1 | 6/2002 | Taira | |
| 6,447,720 B1 | 9/2002 | Horton, III et al. | |
| 6,447,721 B1 | 9/2002 | Horton, III et al. | |
| 6,541,771 B2 | 4/2003 | Iwabuchi et al. | |
| 6,570,173 B1 | 5/2003 | Kunkel et al. | |
| 6,620,318 B1 | 9/2003 | Neofotistos et al. | |
| 6,625,824 B1 | 9/2003 | Lutz et al. | |
| 6,685,825 B1 | 2/2004 | Chang | |
| 6,716,345 B2 | 4/2004 | Snyder | |
| 6,797,970 B1 | 9/2004 | Gatter et al. | |
| 6,824,693 B1 | 11/2004 | Sauska et al. | |
| 6,932,903 B2 | 8/2005 | Chang | |
| 6,991,735 B2 | 1/2006 | Martin | |
| 7,022,225 B1 | 4/2006 | Clawson et al. | |
| 7,329,343 B1 | 2/2008 | Barnes | |
| 7,511,281 B2 | 3/2009 | Cooper | |
| 7,612,492 B2 | 11/2009 | Lestician | |
| 7,662,293 B2 | 2/2010 | Brolin et al. | |
| 7,687,785 B2 | 3/2010 | Chen | |
| 7,691,343 B2 | 4/2010 | Ueberall | |
| 7,741,617 B2 | 6/2010 | Matthews et al. | |
| 7,754,090 B1 | 7/2010 | Berg | |
| 7,767,168 B2 | 8/2010 | Namespetra et al. | |
| 7,794,608 B2 | 9/2010 | Denkewicz, Jr. et al. | |
| 7,883,622 B2 | 2/2011 | Barnes | |
| 8,043,500 B2 | 10/2011 | Murg | |
| 8,048,316 B2 | 11/2011 | Denkewicz, Jr. | |
| 8,066,940 B2 | 11/2011 | Denkewicz, Jr. et al. | |
| 8,066,941 B2 | 11/2011 | Denkewicz, Jr. et al. | |
| 8,241,586 B2 | 8/2012 | Burris et al. | |
| 8,246,839 B2 | 8/2012 | Ueberall | |
| 8,343,342 B2 | 1/2013 | Foret | |
| 8,367,007 B2 | 2/2013 | Otero et al. | |
| 8,414,839 B1 | 4/2013 | Barnes | |
| 8,475,725 B1 | 7/2013 | Antipenko et al. | |
| 8,481,985 B2 | 7/2013 | Meister | |
| 8,487,267 B2 | 7/2013 | Abe et al. | |
| 8,491,775 B1 | 7/2013 | Barnes | |
| 8,492,736 B2 | 7/2013 | Wang et al. | |
| 8,496,610 B2 | 7/2013 | Levenson et al. | |
| 8,506,886 B2 | 8/2013 | Owen et al. | |
| 8,519,356 B2 | 8/2013 | Boyle | |
| 8,529,770 B2 | 9/2013 | Yencho | |
| 8,591,730 B2 | 11/2013 | Yong et al. | |
| 9,102,536 B2 | 8/2015 | Cannavino et al. | |
| 10,106,442 B2 | 10/2018 | Martin et al. | |
| 10,479,705 B2 | 11/2019 | Rochelle | |
| 2005/0051741 A1* | 3/2005 | Hallett | B08B 9/00 250/504 R |
| 2005/0274965 A1 | 12/2005 | Phillips et al. | |
| 2006/0144689 A1 | 7/2006 | Barnes et al. | |
| 2006/0144691 A1 | 7/2006 | Barnes et al. | |
| 2006/0196525 A1* | 9/2006 | Vrtis | C23F 1/12 134/1 |
| 2007/0086912 A1 | 4/2007 | Dowling et al. | |
| 2007/0181498 A1 | 8/2007 | Kaas | |
| 2007/0248488 A1* | 10/2007 | Denkewicz, Jr. | C02F 1/325 422/24 |
| 2008/0142452 A1 | 6/2008 | Denkewicz et al. | |
| 2009/0185953 A1 | 7/2009 | Hallam et al. | |
| 2009/0208386 A1* | 8/2009 | Barsky | C02F 1/32 422/186.3 |
| 2009/0269240 A1 | 10/2009 | Tanaka | |
| 2010/0015013 A1 | 1/2010 | Sutton | |
| 2010/0025337 A1 | 2/2010 | Yencho | |
| 2010/0059455 A1 | 3/2010 | Hsueh et al. | |
| 2010/0209294 A1 | 8/2010 | Owen et al. | |
| 2010/0237254 A1 | 9/2010 | Mason et al. | |
| 2010/0258508 A1 | 10/2010 | Levy | |
| 2010/0313524 A1* | 12/2010 | Pape | F25C 5/187 53/459 |
| 2011/0318237 A1 | 12/2011 | Woodling et al. | |
| 2012/0051977 A1 | 3/2012 | Boodaghians et al. | |
| 2012/0327657 A1 | 12/2012 | Pickard et al. | |
| 2013/0048545 A1 | 2/2013 | Shatalov et al. | |
| 2013/0146783 A1 | 6/2013 | Boodaghians et al. | |
| 2014/0202948 A1 | 7/2014 | Li | |
| 2014/0263087 A1 | 9/2014 | Renaud et al. | |
| 2014/0263091 A1 | 9/2014 | Carter, III et al. | |
| 2015/0166368 A1 | 6/2015 | Braunberger | |
| 2016/0122208 A1 | 5/2016 | Denkewicz et al. | |
| 2016/0122210 A1 | 5/2016 | Cosac Albu | |
| 2017/0066667 A1* | 3/2017 | Harris | E04H 4/1281 |
| 2017/0283279 A1 | 10/2017 | Pelletier et al. | |
| 2018/0160694 A9* | 6/2018 | Foret | A23C 3/076 |
| 2019/0127253 A1* | 5/2019 | Thomas | E03B 3/28 |

FOREIGN PATENT DOCUMENTS

| | | | |
|---|---|---|---|
| DE | 3441535 A1 | 6/1986 | |
| EP | 1602628 A1 | 12/2005 | |
| EP | 2567713 A1 | 3/2013 | |
| GB | 2306463 A | 5/1997 | |
| GB | 2467131 A | 7/2010 | |
| JP | H11-87770 A | 3/1999 | |
| WO | 2004/071965 A1 | 8/2004 | |

(56) References Cited

FOREIGN PATENT DOCUMENTS

| WO | 2005/105675 A1 | 11/2005 |
| WO | 2009/006702 A1 | 1/2009 |
| WO | 2009/013507 A1 | 1/2009 |
| WO | 2009/052831 A1 | 4/2009 |
| WO | 2014/115146 A1 | 7/2014 |
| WO | 2016/001227 A1 | 1/2016 |

OTHER PUBLICATIONS

Denkewicz, "The Efficacy of a Combined Approach," Water Quality Products, Water Disinfection, vol. 12, No. 2, Feb. 2007 (3 pages).
Denkewicz, "UV & Ozone Working Together to Improve Water Quality," Water Quality Products, May 2008 (2 pages).
Denkewicz, et al., "Co-Generation of UV, Ozone, and Hydroxyl Radicals and its Strategic Use for Aquatic Treatment," PowerPoint presentation presented at World Aquatic Health Conference in Indianapolis, IN, Oct. 18, 2013 (61 pages).
International Search Report and Written Opinion of the International Searching Authority dated Jul. 30, 2014, issued in connection with International Application No. PCT/US2014/028042 (9 pages).
International Search Report and Written Opinion of the International Searching Authority dated Dec. 3, 2015, Issued in connection with International Application No. PCT/US15/47480 (8 pages).
Extended European Search Report dated Sep. 28, 2016, issued in connection with European Patent Application No. 14764113.8 (9 pages).
Office Action dated Mar. 13, 2017, issued in connection with U.S. Appl. No. 14/212,044 (13 pages).
Office Action dated Oct. 6, 2017, issued in connection with U.S. Appl. No. 14/212,044 (16 pages).
Communication Pursuant to Article 94(3) dated Nov. 22, 2017, issued by the European Patent Office in connection with European Patent Application No. 14764113.8 (5 pages).
Extended European Search Report dated Mar. 29, 2018, issued in connection with European Patent Application No. 15836872.0 (16 pages).
Office Action dated May 3, 2018, issued in connection with U.S. Appl. No. 14/212,044 (16 pages).
Office Action dated Jun. 1, 2018, issued in connection with U.S. Appl. No. 14/839,166 (10 pages).
Extended European Search Report dated Aug. 8, 2018, issued in connection with European Patent Application No. 18176164.4 (10 pages).
Communication Pursuant to Article 94(3) dated Aug. 10, 2018, issued by the European Patent Office in connection with European Patent Application No 14764113.8 (5 pages).
Examination Report No. 1 dated Oct. 29, 2018, issued in connection with Australian Patent Application No. 2015308654 (4 pages).
Office Action dated Dec. 6, 2018, issued in connection with U.S. Appl. No. 14/212,044 (16 pages).
Office Action dated Dec. 19, 2018, issued in connection with U.S. Appl. No. 14/839,166 (18 pages).
Office Action dated Jun. 26, 2019, issued in connection with U.S. Appl. No. 14/839,166 (17 pages).
Canadian Office Action dated Sep. 25, 2019, issued in connection with Canadian Patent Application No. 3,007,269 (5 pages).
Examination Report dated Oct. 7, 2019, issued by the European Patent Office in connection with European Patent Application No. 18176164.4 (5 pages).
International Search Report and Written Opinion of the International Searching Authority, dated Oct. 29, 2019, issued in connection with International Application No. PCT/US2019/045329 (8 pages).
Examination Report No. 2, dated Sep. 16, 2019, issued in connection with Australian Patent Application No. 2015308654 (4 pages).
Office Action dated Jan. 8, 2020, issued in connection with U.S. Appl. No. 14/839,166 (16 pages).
Communication Pursuant to Article 94(3) dated Jun. 12, 2020, issued by the European Patent Office in connection with European Patent Application No. 18176164.4 (10 pages).
Office Action dated Jun. 25, 2020, issued by the Canadian Intellectual Property Office in connection with Canadian Patent Application No. 3,007,269 (4 pages).
AstralPool, Neolysis Installation and Maintenance Manual, version dated Aug. 8, 2016 (40 pages).
"Disinfection Equipment" AstralPool archived webpage dated Mar. 21, 2017 <http://web.archive.org/web/20170321051150/http:/www.astralpool.com:80/en/products/swiimming-pool/disinfection-equipment-1/> (2 pages).
"Neolysis Equipment" AstralPool archived webpage dated Apr. 28, 2017 <http://web.archive.org/web/20170428222051/http:/www.astralpool.com/en/products/swiimming-pool/disinfection-equipment-1/neolysis-aquipment-4/> (1 page).
"Neolysis LS (1.5-3 g/l) + UV for Private Pools" AstralPool archived webpage dated Jul. 9, 2017 <http://web.archive.org/web/20170709212113/http:/www.astralpool.com/en/products/swiimming-pool/disinfection-equipment-1/neolysis-equipment-4/private-pools-neolysis-1/> (2 pages).
INYO Pools Forum, "UV/Ozone/Salt" discussion thread, Dec. 14, 2016, https://www.inyopools.com/Forum/thread/uv-ozone-salt/ (3 pages).
Summons to Attend Oral Proceedings dated Jul. 15, 2021, issued by the European Patent Office in connection with European Patent Application No. 18176164.4 (8 pages).
Extended European Search Report dated Feb. 23, 2022, issued in connection with European Appln. No. 19847450.4 (10 pages).

* cited by examiner

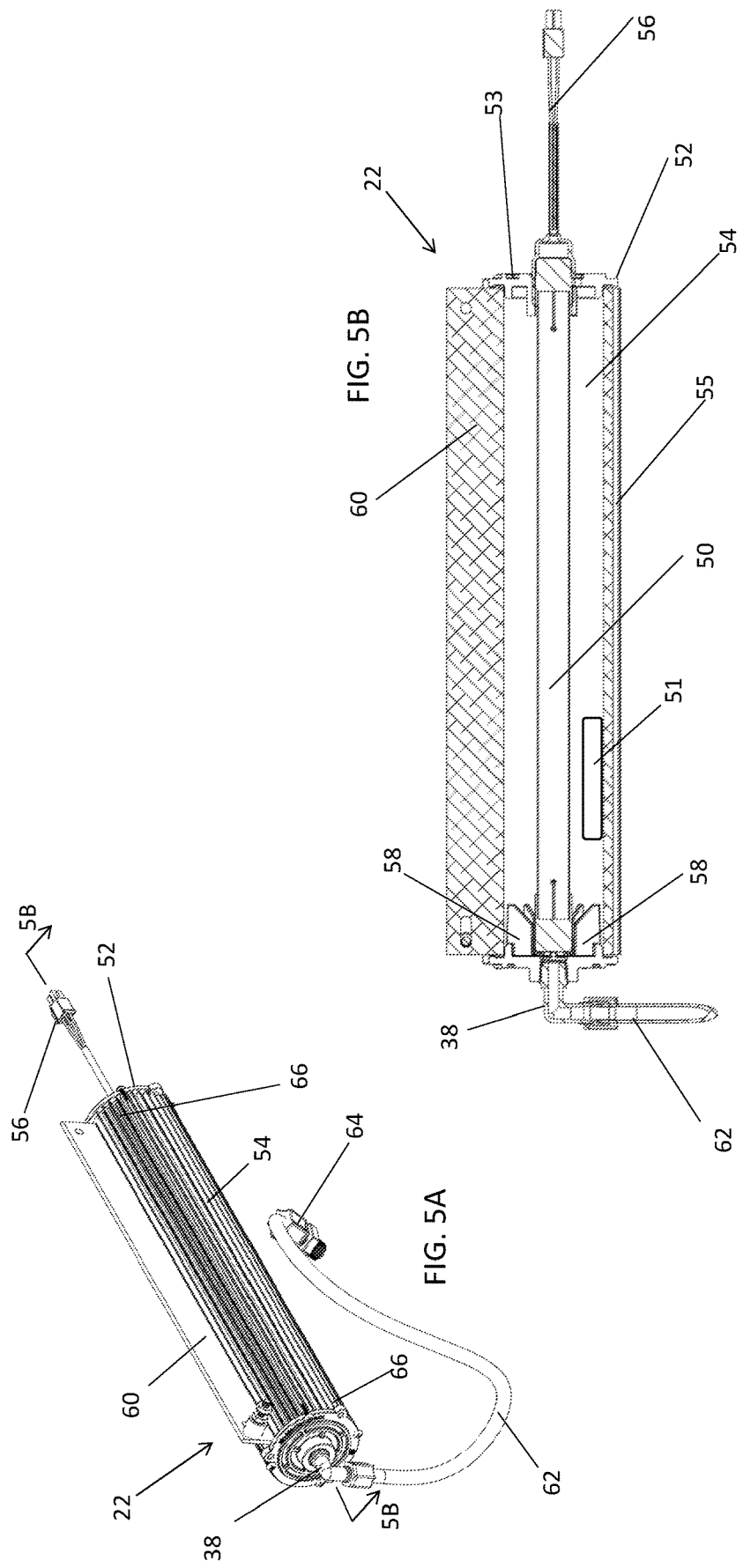

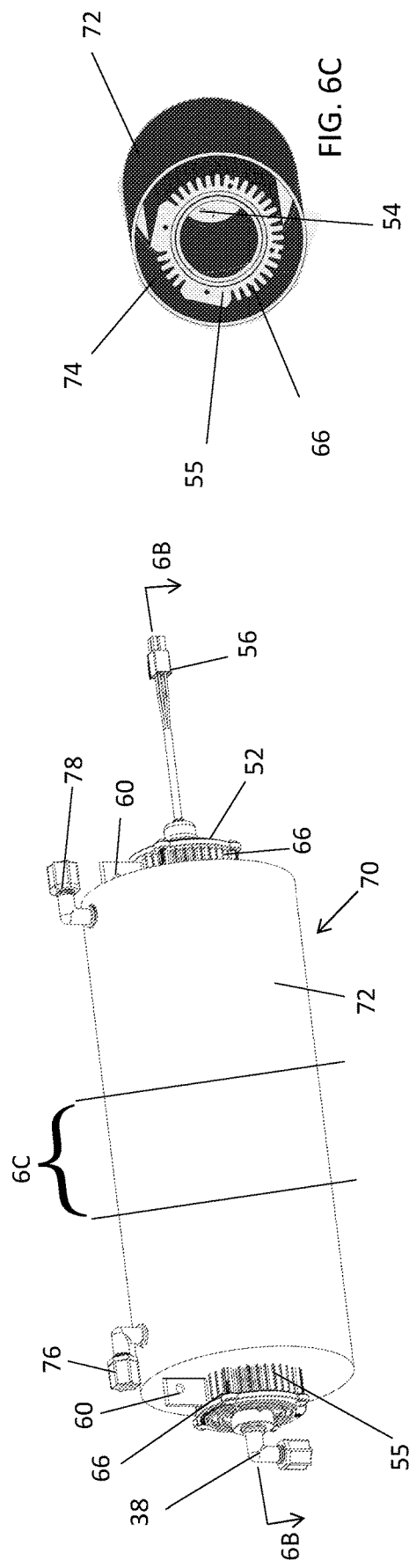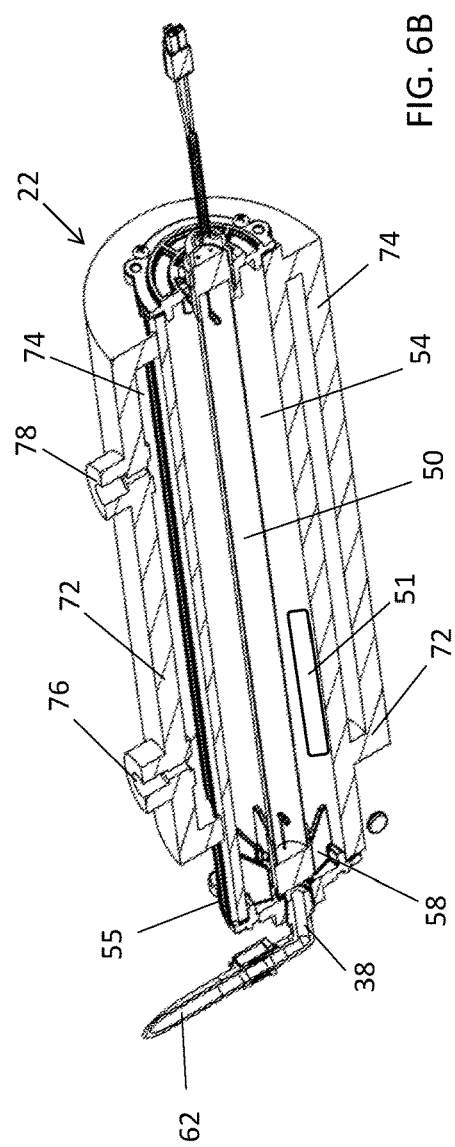

COMBINATION ULTRAVIOLET RAY AND OZONE WATER SANITIZING UNIT

RELATED APPLICATIONS

This application claims the benefit of U.S. provisional patent application 62/517,748, filed Jun. 9, 2017 titled "Combination Ultraviolet Ray and Ozone Water Sanitizing Unit," the entirety of the disclosure of which is incorporated by this reference.

TECHNICAL FIELD

Aspects of this document relate generally to systems for sanitization of swimming pool water, and more particularly to a combination ultraviolet ray and ozone water sanitizing unit.

BACKGROUND

Swimming pools and spas (collectively swimming pool(s) or pool(s) herein) may advantageously employ a water sanitizing unit in line with the swimming pool pump. In addition to the chemicals conventionally added to the water of a swimming pool, a water sanitizing unit sanitizes the water in the pool, requiring less Chlorine. Some water sanitizing units use ultraviolet (UV) radiation to sanitize water passing the UV light and others add ozone to the water to sanitize it. Conventional water sanitizing units are designed for positioning on either the pressure side or the suction side of a swimming pool filtering system.

SUMMARY

According to an aspect, a swimming pool water sanitizing unit may comprise a pool water inlet and a pool water outlet extending from a sanitizing unit housing, a sanitizing unit control center on or within the sanitizing unit housing, an ozone generator within the sanitizing unit housing and comprising an outer casing, an ozone generator chamber configured to receive a first UV light source within the ozone generator chamber and to generate ozone enriched fluid and output the ozone enriched fluid through an ozone output of the ozone generator chamber, the ozone generator chamber surrounded by a plurality of heat sink fins extending from the ozone generator chamber, and a water jacket gap between the ozone generator chamber and the outer casing, the water jacket gap fluidly coupled to both an ozone generator water inlet and an ozone generator water outlet, the ozone generator chamber further comprising a first UV intensity sensor within the ozone generator chamber, the first UV intensity sensor configured to send first UV intensity data to the sanitizing unit control center to indicate when the first UV light source drops below a predetermined first UV intensity level as measured at the first UV intensity sensor, an ultraviolet (UV) reactor chamber within the sanitizing unit housing and configured to receive and enclose a second UV light source within the UV reactor chamber, the UV reactor chamber fluidly coupled to both an UV reactor chamber water inlet and an UV reactor chamber water outlet such that fluid flowing through the UV reactor chamber from the UV reactor chamber water inlet to the UV reactor chamber water outlet passes by the second UV light source when the second UV light source is received in the UV reactor chamber, the UV reactor chamber further comprising a second UV intensity sensor within the UV reactor chamber, the second UV intensity sensor configured to send second UV intensity data to the sanitizing unit control center to indicate when the second UV light source drops below a predetermined second UV intensity level as measured at the second UV intensity sensor, the UV reactor chamber further comprising a plurality of water paddle blades extending radially about an axial center of the UV reactor chamber adjacent the UV reactor chamber water inlet and configured to rotate about the axial center of the UV reactor chamber, an ozone injector within the sanitizing unit housing and fluidly coupled to the ozone output of the ozone generator and to an input to the UV reaction chamber, and a diverter valve fluidly coupled to the ozone output of the ozone generator and an ozone system output, the diverter valve adjustable to regulate an amount of the ozone enriched fluid diverted from the ozone generator to a suction side of a swimming pool pump.

Particular embodiments may comprise one or more of the following features. A pressure differential sensor electronically coupled with the sanitizing unit control center, the sanitizing unit control center configured to turn off the sanitizing unit or reduce its power usage when the pressure differential sensor indicates that the water flow through the sanitizing unit is below a predetermined magnitude. A wireless transmitter operatively associated with the sanitizing unit control center, the wireless transmitter configured to transmit a signal to indicate when the first UV light source or the second UV light source is in need of replacement. A wireless transceiver operatively associated with the sanitizing unit control center, the wireless transceiver configured to transmit a signal to indicate when the sanitizing unit is in need of service or to receive a signal to change settings on the sanitizing unit through wireless communication with the control center. The pool water inlet may comprise a first inlet arm and a second inlet arm, and wherein the ozone injector comprises a venturi injector fluidly coupled to the ozone output of the ozone generator at a fluid input to the venturi injector, the venturi injector comprising a venturi nozzle coupled between the first inlet arm and the second inlet arm such that the venturi injector extends between the first inlet arm and the second inlet arm and is configured to inject ozone enriched fluid from the ozone generator into the venturi injector as pool water passes between the venturi injector. A chlorine feeder coupled to the pool water inlet. The UV reactor chamber may further comprise a first cleaning port adjacent the first end of the UV reactor chamber and separate from the UV reactor chamber water inlet, and a second cleaning port adjacent the second end of the UV reactor chamber and separate from the UV reactor chamber outlet, the first and second cleaning ports each comprising a removable plug within them. The UV reactor chamber may further comprise an off-gassing valve adjacent the second end of the UV reactor chamber, the off-gassing valve configured to release gas collected within the UV reactor chamber adjacent the second end of the UV reactor chamber.

According to an aspect, a swimming pool water sanitizing unit may comprise a pool water inlet and a pool water outlet extending from a sanitizing unit housing, an ozone generator within the sanitizing unit housing and comprising an outer casing, an ozone generator chamber configured to receive an ozone source within the ozone generator chamber and to generate ozone enriched fluid and output the ozone enriched fluid through an ozone output of the ozone generator chamber, an ultraviolet (UV) reactor chamber within the sanitizing unit housing and configured to receive and enclose an UV light source within the UV reactor chamber, the UV reactor chamber fluidly coupled to both an UV reactor chamber water inlet and an UV reactor chamber water outlet such that fluid flowing through the UV reactor chamber from the UV reactor chamber water inlet to the UV reactor chamber water outlet passes by the UV light source when the UV light source is received in the UV reactor chamber, the UV reactor chamber further comprising a plurality of water paddle blades extending radially about an axial center of the UV reactor chamber adjacent the UV reactor chamber water inlet and configured to rotate about the axial center of the UV reactor chamber, and an ozone injector within the sanitizing unit housing and fluidly coupled to the ozone output of the ozone generator and an input to the UV reaction chamber.

Particular embodiments may comprise one or more of the following features. A diverter valve fluidly coupled to the ozone output of the ozone generator, the ozone injector and an ozone system output, the diverter valve adjustable to regulate an amount of the ozone enriched fluid diverted from the ozone generator to a suction side of a swimming pool pump. A UV intensity sensor within at least one of the UV reactor chamber and the ozone generator chamber, the UV intensity sensor configured to send UV intensity data to the sanitizing unit control center to indicate when UV intensity within the at least one of the UV reactor chamber and the ozone generator chamber drops below a predetermined UV intensity level as measured at the UV intensity sensor. A pressure differential sensor electronically coupled with the sanitizing unit control center, the sanitizing unit control center configured to turn off the sanitizing unit or reduce its power usage when the pressure differential sensor indicates that the water flow through the sanitizing unit is below a predetermined magnitude. A wireless transmitter operatively associated with the sanitizing unit control center, the wireless transmitter configured to transmit a signal to indicate when the ozone generating light source or the UV light source is in need of replacement. A wireless transmitter operatively associated with the sanitizing unit control center, the wireless transmitter configured to transmit a signal to indicate when the sanitizing unit is in need of service. The pool water inlet may comprise a first inlet arm and a second inlet arm, and wherein the ozone injector comprises a venturi injector fluidly coupled to the ozone output of the ozone generator at a fluid input to the venturi injector, the venturi injector comprising a venturi nozzle coupled to the first inlet arm and to the second inlet arm such that the venturi injector extends between the first inlet arm and the second inlet arm and is configured to inject ozone enriched fluid from the ozone generator into the venturi injector as pool water passes between the venturi injector. The UV reactor chamber may further comprise a first cleaning port adjacent the first end of the UV reactor chamber and separate from the UV reactor chamber water inlet, and a second cleaning port adjacent the second end of the UV reactor chamber and separate from the UV reactor chamber outlet, the first and second cleaning ports each comprising a removable plug within them. The UV reactor chamber may further comprise an off-gassing valve adjacent the second end of the UV reactor chamber, the off-gassing valve configured to release gas collected within the UV reactor chamber adjacent the second end of the UV reactor chamber.

According to an aspect, a swimming pool water sanitizing unit may comprise a pool water inlet and a pool water outlet extending from a sanitizing unit housing, an ozone generator within the sanitizing unit housing, the ozone generator comprising an ozone generator chamber with an ozone output, an ultraviolet (UV) reactor chamber within the sanitizing unit housing, the UV reactor chamber comprising a UV reactor chamber water inlet adjacent a first end of the UV reactor chamber and a UV reactor chamber water outlet adjacent a second end of the UV reactor chamber, and an ozone injector within the sanitizing unit housing and fluidly coupled to the ozone output, the pool water input and the UV reactor chamber water input.

Particular embodiments may comprise one or more of the following features. A diverter valve fluidly coupled to the ozone output of the ozone generator, the ozone injector and an ozone system output, the diverter valve adjustable to regulate an amount of the ozone enriched fluid diverted from the ozone generator to a suction side of a swimming pool pump. The pool water inlet may comprise a first inlet arm and a second inlet arm, and wherein the ozone injector comprises a venturi injector fluidly coupled to the ozone output of the ozone generator at a fluid input to the venturi injector, the venturi injector comprising a venturi nozzle coupled between the first inlet arm and the second inlet arm such that the venturi injector extends between the first inlet arm and the second inlet arm and is configured to inject ozone enriched fluid from the ozone generator into the venturi injector as pool water passes between the venturi injector. A UV intensity sensor within at least one of the UV reactor chamber and the ozone generator chamber, the UV intensity sensor configured to send UV intensity data to a sanitizing unit control center to indicate when UV light intensity drops below a predetermined UV intensity level as measured at the UV intensity sensor. The UV reactor chamber may further comprise a plurality of water paddle blades extending radially about an axial center of the UV reactor chamber adjacent the UV reactor chamber water inlet and configured to rotate about the axial center of the UV reactor chamber. The UV reactor chamber may further comprise a first cleaning port adjacent the first end of the UV reactor chamber and separate from the UV reactor chamber water inlet, and a second cleaning port adjacent the second end of the UV reactor chamber and separate from the UV reactor chamber outlet, the first and second cleaning ports each comprising a removable plug within them.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain, and ordinary meaning to the terms be applied to the interpretation of the specification and claims.

The inventors are also aware of the normal precepts of English grammar. Thus, if a noun, term, or phrase is intended to be further characterized, specified, or narrowed in some way, such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112, ¶6. Thus, the use of the words "function," "means" or "step" in the Detailed Description or Description of the Drawings or claims is not intended to somehow indicate a desire to invoke the special provisions of 35 U.S.C. § 112, ¶6, to define the invention. To the contrary, if the provisions of 35 U.S.C. § 112, ¶6 are sought to be invoked to define the inventions, the claims will specifically and expressly state the exact phrases "means for" or "step for", and will also recite the word "function" (i.e., will state "means for performing the function of [insert function]"), without also reciting in such phrases any structure, material, or acts in support of the function. Thus, even when the claims recite a "means for performing the function of . . . " or "step for performing the function of . . . ," if the claims also recite any structure, material, or acts in support of that means or step, or to perform the recited function, it is the clear intention of the inventors not to invoke the provisions of 35 U.S.C. § 112, ¶6. Moreover, even if the provisions of 35 U.S.C. § 112, ¶6, are invoked to define the claimed aspects, it is intended that these aspects not be limited only to the specific structure, material, or acts that are described in the preferred embodiments, but in addition, include any and all structures, material, or acts that perform the claimed function as described in alternative embodiments or forms in the disclosure, or that are well-known present or later-developed, equivalent structures, material, or acts for performing the claimed function.

The foregoing and other aspects, features, and advantages will be apparent to those artisans of ordinary skill in the art from the DETAILED DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 5A is a perspective view of an ozone reactor with exposed heat dissipating fins;

FIG. 5B is a cross-sectional view of FIG. 5A taken along section lines 5B-5B;

FIG. 6A is a perspective view of an ozone reactor with covered heat dissipating fins;

FIG. 6B is a cross-sectional view of FIG. 6A taken along section lines 6B-6B;

FIG. 6C is a sectional view of FIG. 6A taken at section 6C;

DETAILED DESCRIPTION

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The words "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes embodiments of many different forms, there is shown in the figures and will herein be described in detail particular embodiments with the understanding that the present disclosure is to be considered as an exemplification of the principles of the disclosed methods and systems, and is not intended to limit the broad aspect of the disclosed concepts to the embodiments illustrated.

Figure 1B:
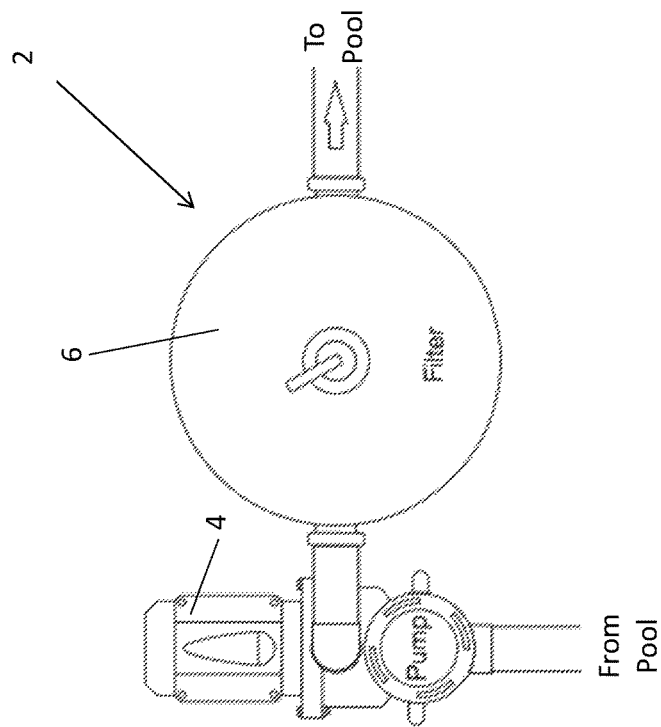
FIG. 1B is a top view of the prior art filter and pump system of FIG. 1.
Figure 1A:
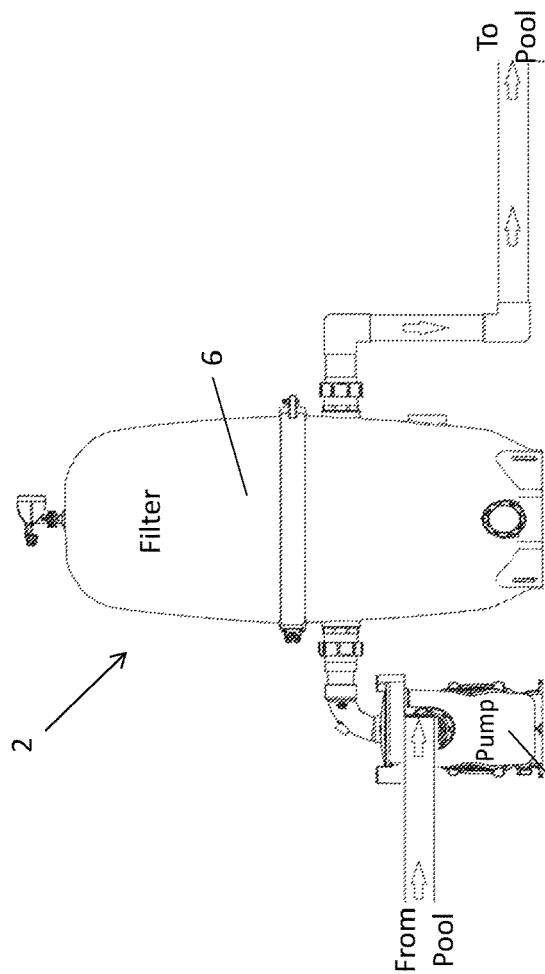
FIG. 1A is a side view of a prior art filter and pump system.

FIGS. 1A and 1B illustrate a prior art embodiment of a swimming pool water filtration system 2 comprising a pump 4 and a filter 6. The pump 4 draws water through suction from the pool and forces the water through the filter 6 back to the pool through pressure. The plumbing between the pool and the suction portion of the pump is called the suction side of the pump, and the plumbing between the pool and the pressure portion of the pump is called the pressure side of the pump. Depending upon the configuration of the pool and equipment, and the particular preferences of the installer, some installers install sanitation systems to feed ozone enriched fluids into the suction side of the pump, and some install to feed ozone enriched fluids after the pump directly into the pool from the pressure side of the pump. Particular embodiments of the presently disclosed water sanitizing unit allow an installer and user to feed ozone into either or both of the pressure side and the suction side of the pump, giving the installer the option of most optimal placement of the ozone enriched fluids for the given swimming pool and filtering system.

Figure 2B:
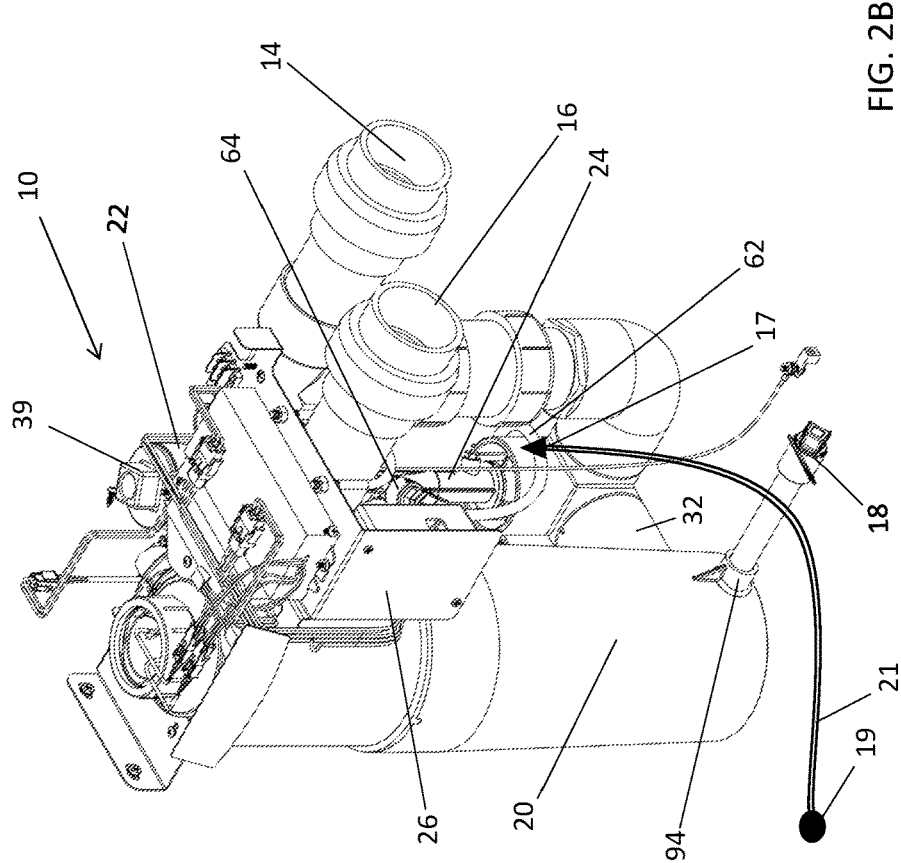
FIG. 2B; is a perspective view of the swimming pool water sanitizing unit of FIG. 2A with the housing removed.
Figure 2A:
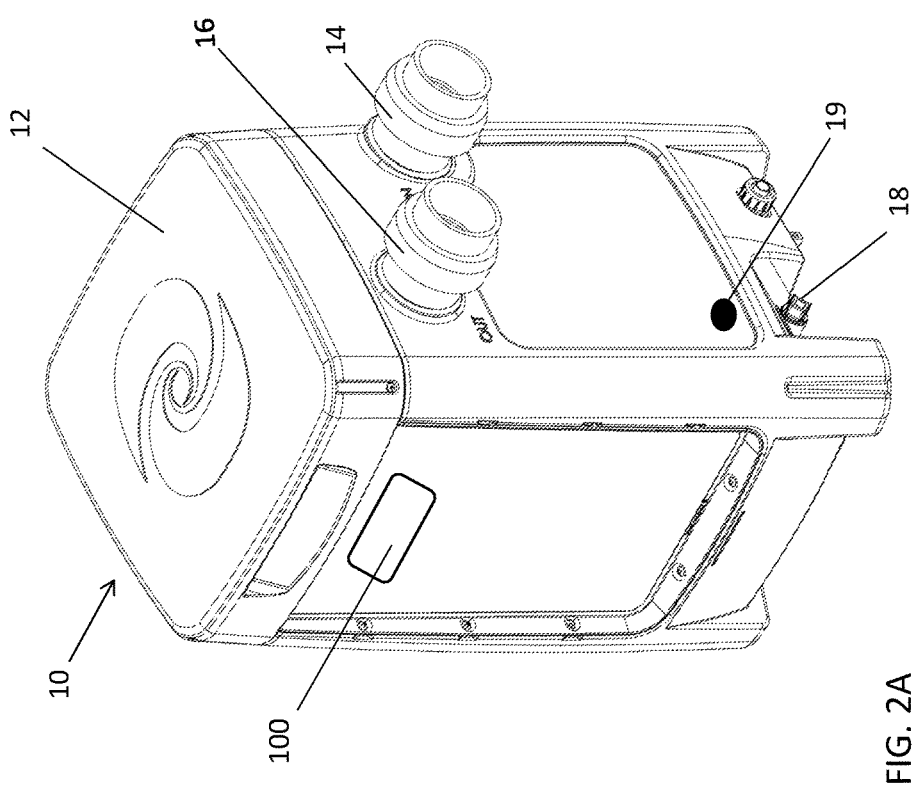
FIG. 2A; is a perspective view of a swimming pool water sanitizing unit within a housing.
Figure 3:
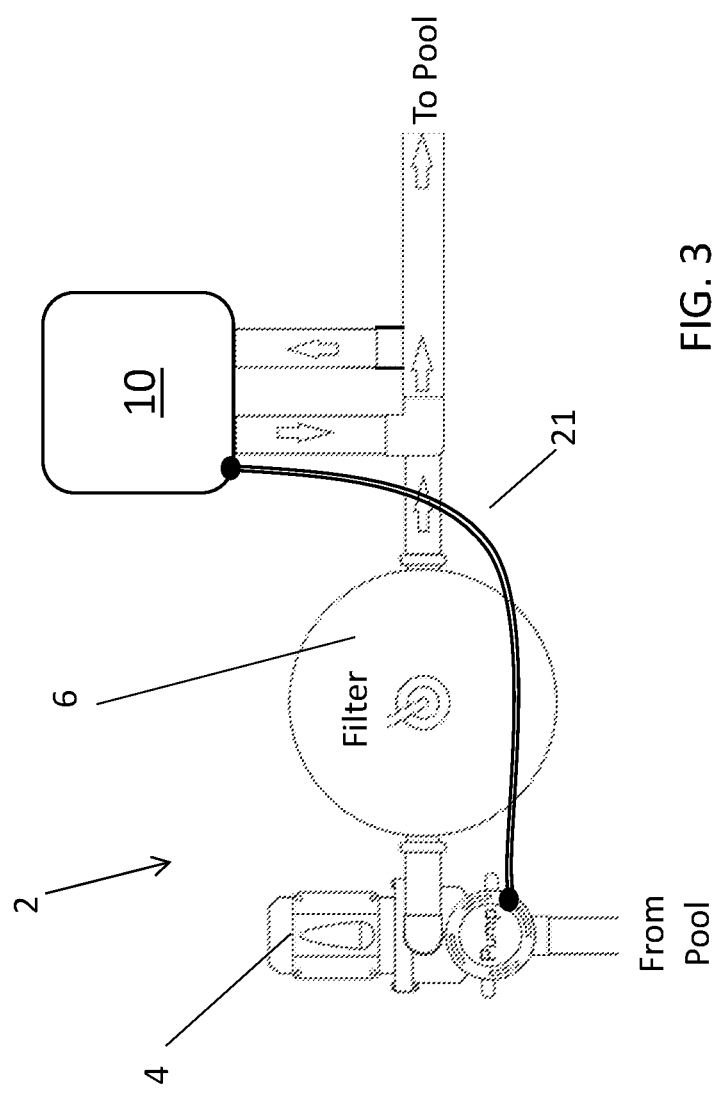
FIG. 3 is a system view of a swimming pool water sanitizing unit coupled to the pressure side of the pump.
Figure 4A:
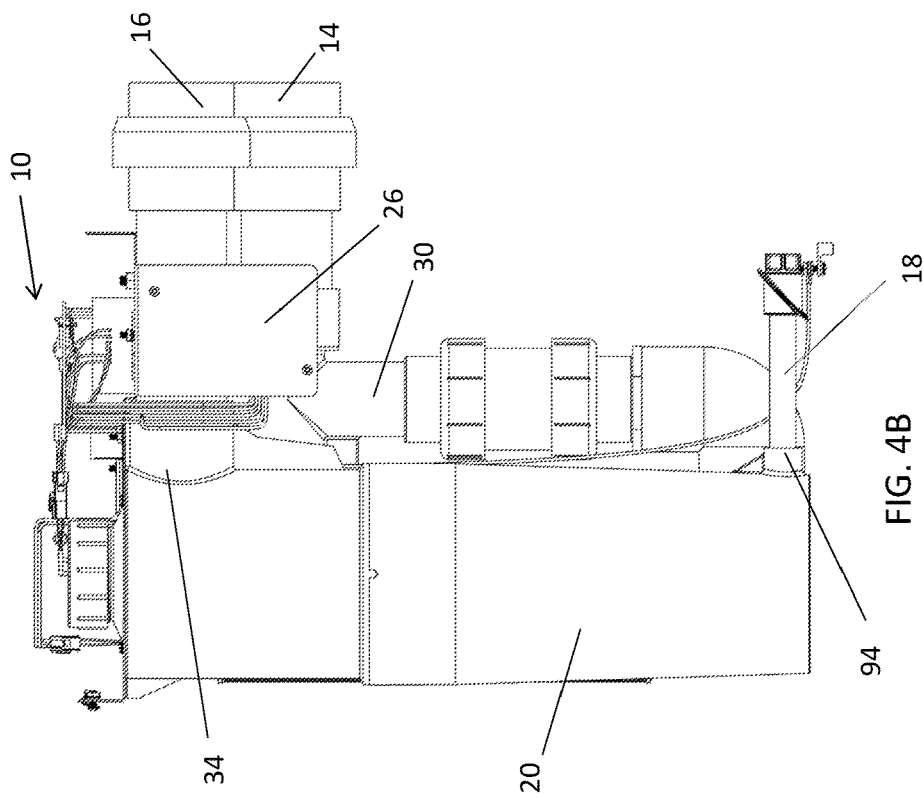
FIGS. 4A-4E are front, left, rear, right and top side views of the swimming pool water sanitizing unit of FIG. 2B with the housing removed.
Figure 4B:
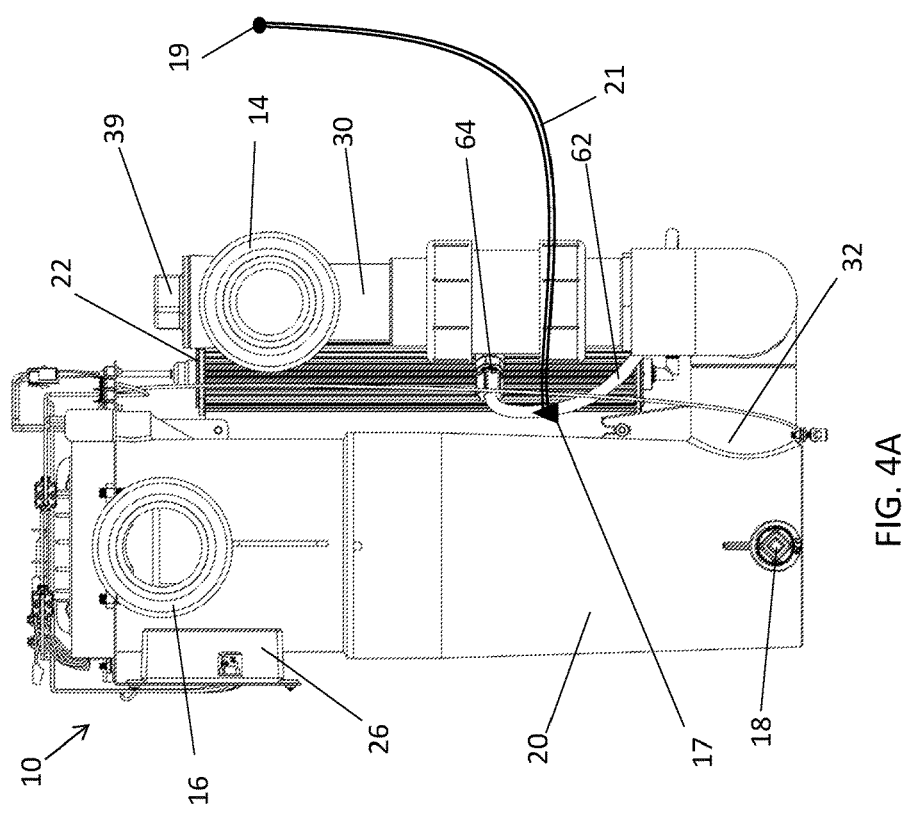
Figure 4D:
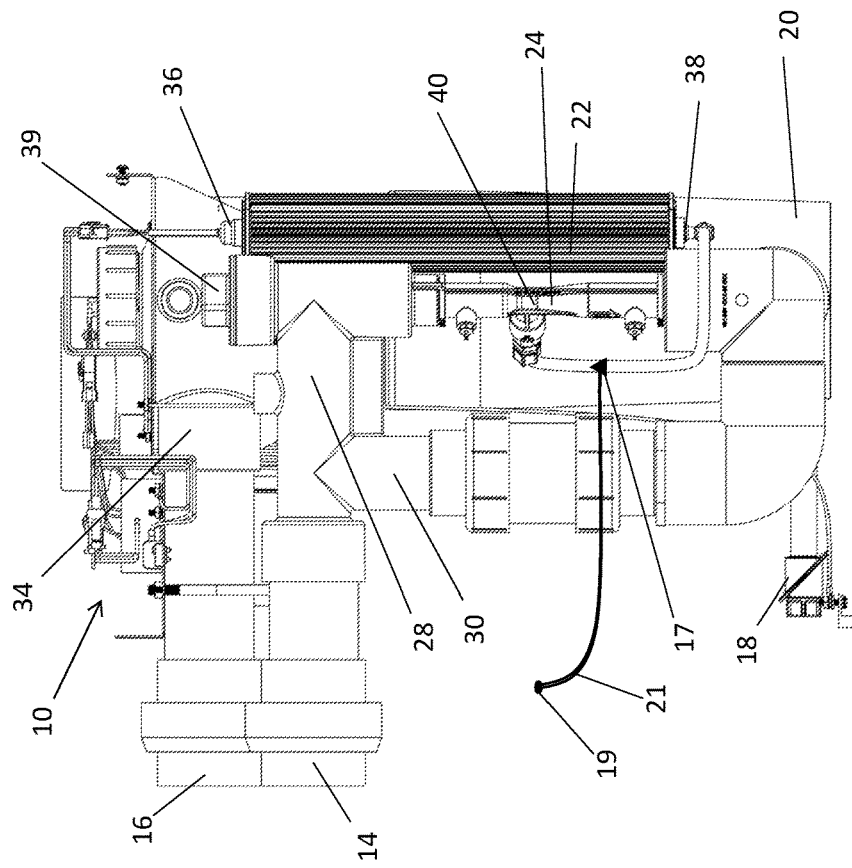
Figure 4C:
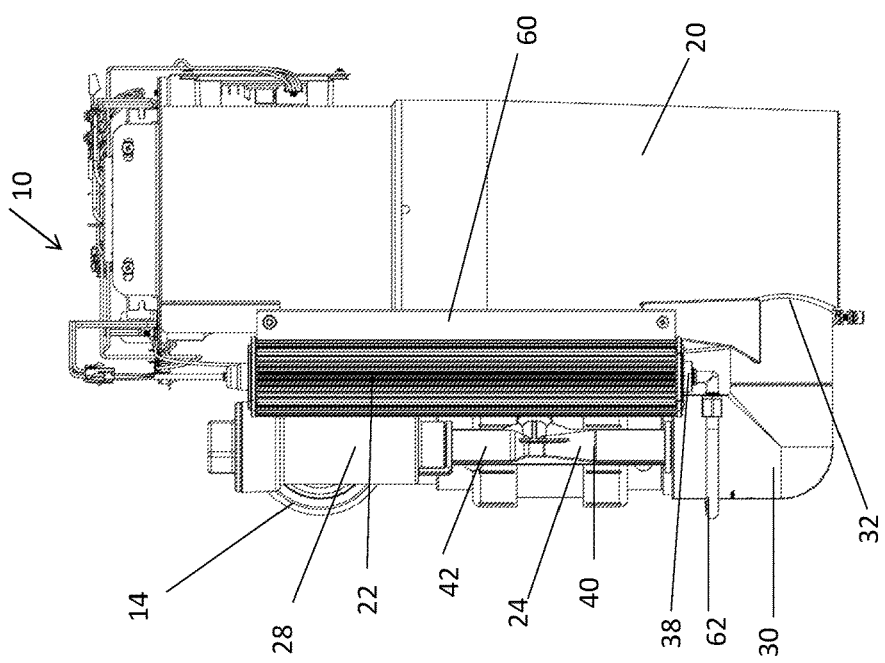
Figure 4E:
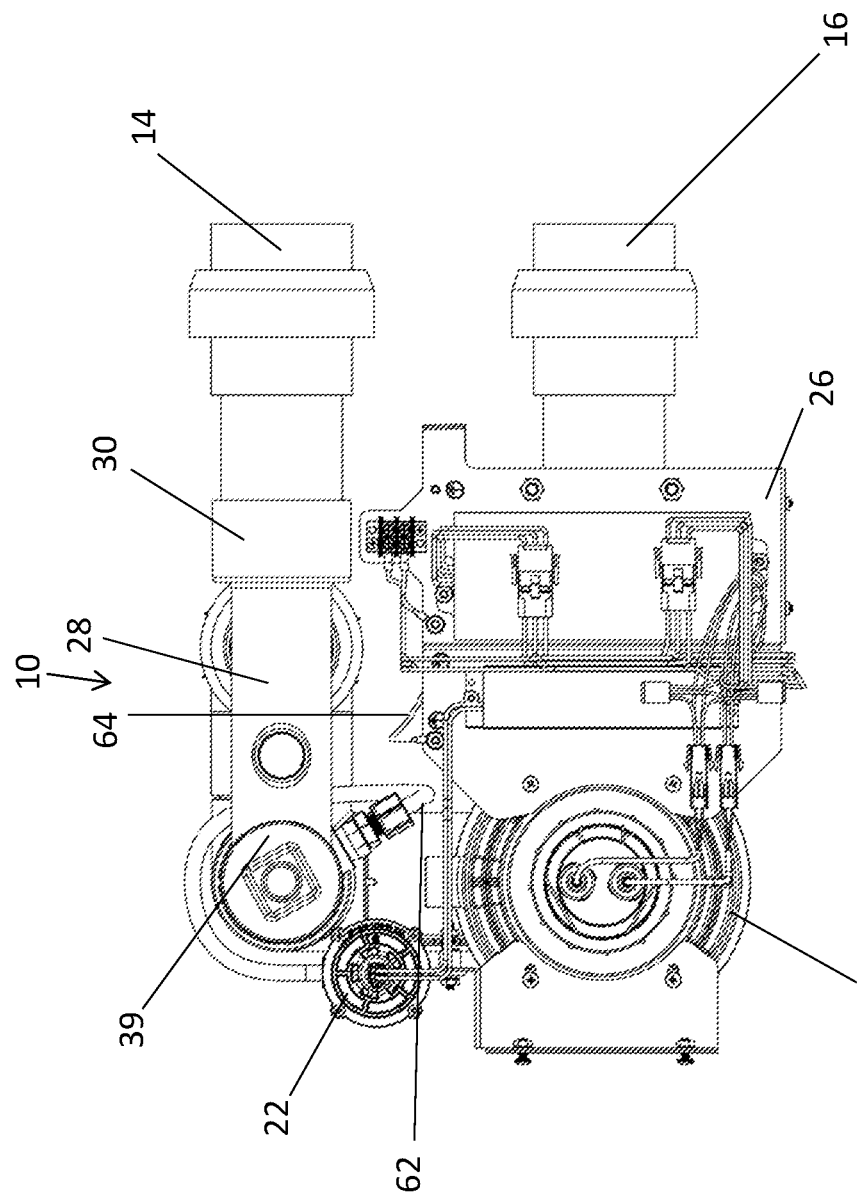

FIG. 2A illustrates a water sanitizing unit 10 with a housing 12. Pool water inlet 14 and pool water outlet 16 may be connected to the appropriately oriented water flow lines to pass pool water through the pool water sanitizing unit 10. A drain 18 on the outside of the housing 12 assists in draining, winterizing and cleaning of an ultraviolet (UV) reactor chamber 20 (FIG. 2B). A connector 19 for an optional diverter line 21 that may extend from the housing 12. FIG. 2B illustrates the water sanitizing unit 10 with the housing 12 removed. Inside the housing 12, the water sanitizing unit 10 includes an UV reactor chamber 20, an ozone generator 22, an ozone injector 24, and a sanitizing unit control center 26 with a bonding wire extending to the housing 12 (FIG. 2A), as well as other various electrical wires to provide electrical communication and power to the UV reactor chamber 20 and the ozone generator 22, and mounting brackets and fasteners to couple the various components into the housing 12 and to each other. An optional diverter 17 with a diverter line 21 may be connected to the ozone connecting hose 62 to allow an installer to divert none, all, or a portion of the ozone enriched fluid from the ozone generator 22 to the suction side of the pump. The diverter 17 may be configured as a Y valve that couples to the ozone connecting hose 62 or elsewhere between the ozone output 38 and the venturi nozzle 24. Each exit branch of the Y valve may have a valve on it to balance the amount of suction each creates. Some prefer to have more ozone on the suction side of the pump because there is better mixing of the ozone with the pool water in the pump and filter, and others prefer to have more ozone in the UV chamber to create hydroxyl radicals. FIG. 3 illustrates a water sanitizing unit 10 coupled to a swimming pool filtration system 2 on the pressure side with an optional diverter line 21 extending to the suction side of the pump.

In particular embodiments, a pressure differential sensor (generating a voltage or amperage value as an output) is included within the system, such as in line with the pool water inlet or pool water outlet, and operatively coupled to the sanitizing unit control center 26 to convert a pressure differential to a flow rate (in gallons per minute or GPM) with an LCD readout 100 (FIG. 2A) positioned on a visible surface of the unit for use with a UV only sanitization unit or a combination UV and ozone water sanitization unit. Being able to use a pressure differential sensor and a flow switch in combination or by themselves to indicate a certain flow rate or an on/off set point for the system to allow a unit to be turned off and or dimmed when the pump is off or the water flow is not high enough to support the added load of the water sanitation unit on the system, and on when the pump is on and the flow rate is high enough. If there is not enough water flow through the system, the water sanitation unit can overheat. Conventional systems do not use a pressure differential sensor for monitoring flow rate. Most units use a flow switch. The pressure differential sensor could be used either instead of or in addition to the flow switch to turn the system off and on at desired flow rates. By tailoring the water sanitation unit operation times to the flow rate, so that it turns off when there is not enough flow to operate efficiently, energy is also preserved making the unit more cost effective and efficient.

FIGS. 4A-4E illustrate, respectively, front side, right side, rear side, left side and top side views of the water sanitizing unit 10 of FIG. 2B according to a particular embodiment of the disclosure, without the housing 12. The water sanitizing unit 10 receives water through the pool water inlet 14 and that flows through a first inlet arm 30 to a UV reactor chamber water inlet 32, through the UV reactor chamber 20 to a UV reactor chamber water outlet 34, and then to the pool water outlet 16 to ultimately return to the swimming pool. Before the water enters the UV reactor chamber water inlet 32, it receives ozone enriched fluid from the ozone generator 22. The ozone generator 22 includes a power input 36 and an ozone output 38. The ozone output 38 is configured to feed ozone enriched fluid from the ozone generator 22 to an ozone injector 24, which injects the ozone enriched fluid into the pool water fluid stream. An openable access port 39 is included at the top of the second inlet arm 28 to provide access to the inlet arms 28, 30 and the ozone injector 24. The ozone injector 24 of the particular embodiment illustrated in FIGS. 4A-4D is a venturi injector comprising a venturi nozzle 40 with an input coupled to the second inlet arm 28 and an output coupled to the first inlet arm 30 such that the venturi injector extends between the second inlet arm 28 and the first inlet arm 30 and is configured to draw ozone enriched fluid from the ozone generator 22 and inject it into the respective pool water drawn through the pool water inlet as it passes the ozone injector 24 toward the UV reactor chamber 20 through the venturi nozzle 40.

FIGS. 5A and 5B illustrate a particular embodiment of an ozone generator 22. The ozone generator 22 is configured to receive and enclose an ozone source 50, for example in the form of a UV light source, through a removable cap 53 at a first end 52 of an ozone generator chamber 54. The ozone generator chamber 54 has an outer casing 55. Angled fins 58 help to guide the ozone source 50 to seat within the ozone generator chamber 54. Bracket 60 is used to mount the ozone generator 22 to the sanitizing unit 10. Ozone enriched fluid passes from the ozone generator 22 through the ozone output 38 into the ozone connecting hose 62 toward the ozone injector connector 64. Cooling fins 66 to dissipate heat from a thermally conductive outer casing 55 may be used in some embodiments. An optional UV intensity sensor 51 may be included within the ozone generator chamber 54 to identify, in embodiments where a UV bulb is used, when the intensity of the energy emitted by the UV bulb drops below a pre-determined threshold so that the owner knows when to replace the bulb. The UV intensity sensor 51 may be wirelessly or wired-coupled to the control center 26.

An ozone reactor that uses a lamp gets hot. In conventional systems, this can result in reduced ozone output or cause premature failure of the unit. The heat dissipating fins 66 help, but may not be enough in some installations. FIGS. 6A-6C illustrate an embodiment of an ozone generator 70 that is the same as the ozone generator 22 of FIGS. 5A and 5B except that it includes an additional secondary outer casing 72 outside of the thermally conductive outer casing 55. Between the thermally conductive outer casing 55 and the secondary outer casing 72 is a water jacket gap 74 fluidly coupled to both an ozone water inlet 76 and the ozone water outlet 78. Although illustrated for convenience of reference in FIGS. 6A and 6B with the ozone water outlet 78 closest to the first end 52 of the ozone generator 70, the ozone water inlet 76 and the ozone water outlet 78 are interchangeable and the direction of water travel is not important provided water flows through the water jacket gap 74. In embodiments where additional cooling for the ozone generator 70 is desirable, the ozone water inlet 76 and the ozone water outlet 78 are coupled in-line with the pool water inlet 14 and/or the pool water outlet 16, or anywhere between, so that the pool water flowing through the system can be used to provide additional cooling to the ozone generator 70. By coupling the ozone water inlet 76 and the ozone water outlet 78 to receive the pressurized water flow caused by the filtration system pump 4, the water flows through the ozone generator 70 and dissipates heat from the thermally conductive outer casing 55. After the water is passed through the ozone generator 70 water jacket gap 74, it can be mixed back in with the rest of the water flowing through the system and returned to the swimming pool. FIG. 6C shows a sectional view taken from the middle of FIG. 6A, but with the ozone source 50 removed, to illustrate the outer casing 72 surrounding the water jacket gap 74, surrounding the thermally conductive outer casing 55 with the heat dissipating fins 66, surrounding the ozone generator chamber 54. Although the example in FIGS. 6A-6C illustrates a water jacket gap 74 in the form of an annular chamber for water around the ozone chamber 54, any portion around the ozone chamber 54 that is exposed to flowing water will help to cool the ozone chamber 54 and extend the life of the ozone generator 70 and produce higher concentrations of ozone enriched fluid.

The embodiments illustrated in FIGS. 4A-4E show use of an ozone generator 22 like that shown in FIGS. 5A-5B without a secondary outer casing 72 and water jacket gap 74 of FIGS. 6A-6B. However, it should be understood that the ozone generator 70 shown in FIGS. 6A-6B can be interchanged into FIGS. 4A-4E by simply coupling the ozone water inlet 76 and the ozone water outlet 78 to the pressurized water of the system or other pressurized water source. One of ordinary skill in the art will understand how this substitution is made and will readily be able to make the substitution from this explanation. Where the ozone generator 22 is described with reference to the Figures, it should be understood that the discussion applies equally to the ozone generator 70 of FIGS. 6A-6B and that the addition of the secondary outer casing 72 and water jacket gap 74 does not limit the applicability of this embodiment in relation to all embodiments of the water sanitizing units 10 shown and discussed herein.

The water sanitizing unit 10 optionally diverts the ozone enriched fluid flow from the ozone generator 22 to both the suction side of the pump and to the Venturi injector (pressure side) to enable application of ozone enriched fluid flow on both the pressure side and the suction side of the filtration system of a swimming pool at the installer's option with the same water sanitizing unit 10. The venturi injector 24 introduces the ozone enriched fluid into the UV reactor chamber 20. By balancing ozone enriched fluid flow between the suction and pressure sides, ozone enriched fluid flow into the UV reactor chamber 20 can be optimized for best sanitation effectiveness for the particular swimming pool setup and preferences of the installer and pool owner.

When ozone enriched fluid is introduced into a UV reactor chamber 20, the ozone and UV react to create hydroxyl radicals. The combination of UV light and ozone together is much more effective at sanitizing than the UV or ozone separately. However, too much ozone in the UV reactor creates too many bubbles (air containing ozone), which diffracts the UV light too much and degrades the effectiveness of the UV reactor. However, by obtaining a desired ratio of ozone concentration in the water vs. the volume of the UV reactor, water sanitation is maximized for the combination.

In particular embodiments, an optional chlorine feeder or chlorine generator may be added to the sanitation unit in place of the ozone generator 22, or by adapting the connectors for the ozone generator 22 to feed additional chlorine into the UV reactor chamber 20. The inclusion of additional chlorine in the UV reactor chamber 20 further helps in creating hydroxyl radicals to sanitize the water passing through the UV reactor chamber 20. Conventional UV reactors rely on natural induction of chlorine in the UV reactor from the chlorine existing in the swimming pool water. Embodiments of the present disclosure may include a chlorine injection port in the unit, such as through access port 39, to introduce chlorine to the system just before or directly into the ozone injector 24 or the UV reactor chamber 20 to enhance the creation of hydroxyl radicals and the sanitation of the water flowing through the unit. Chlorine generators and chlorine feeders are well known in the art for swimming pool sanitation systems and any of those examples is satisfactory for purposes of use with this disclosure. The additional chlorine generator may be used with or without an ozone generator 22 in particular embodiments.

Figure 7A:
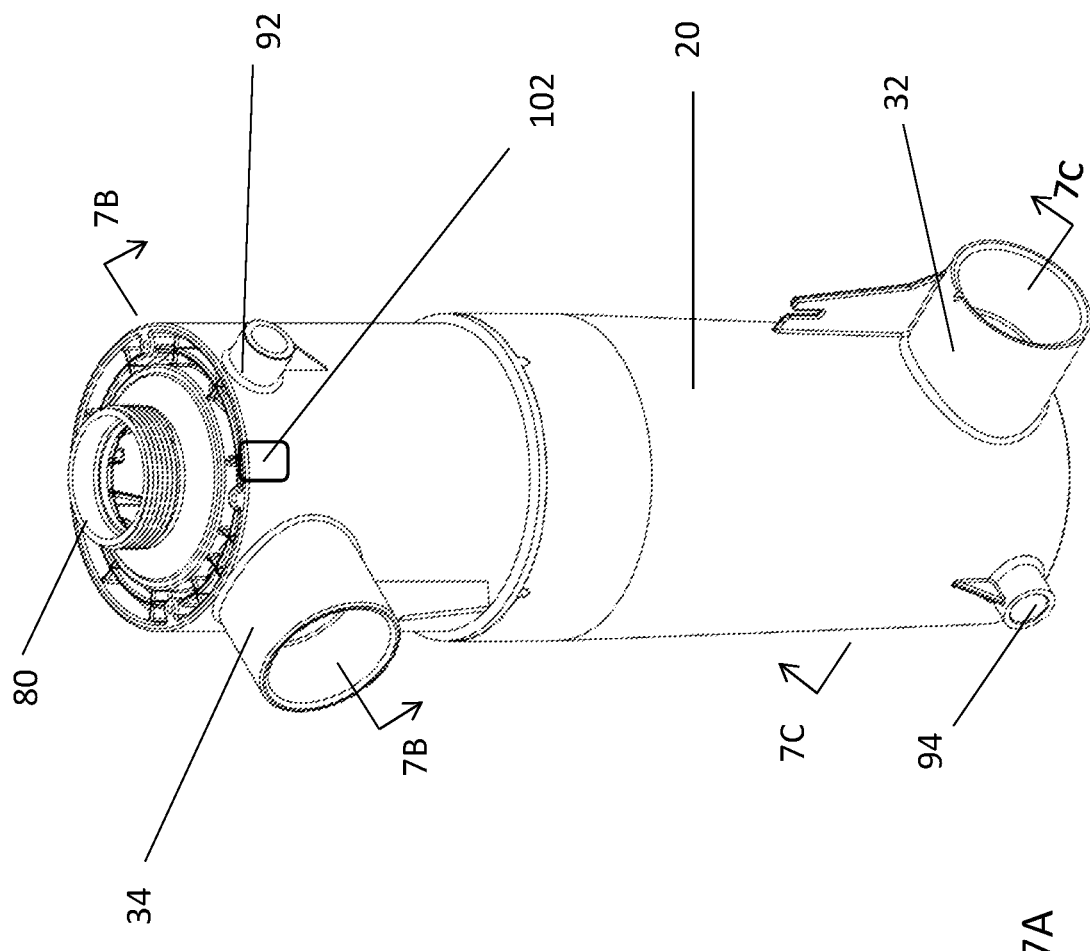
FIG. 7A is a perspective view of an UV reactor chamber.
Figure 7C:
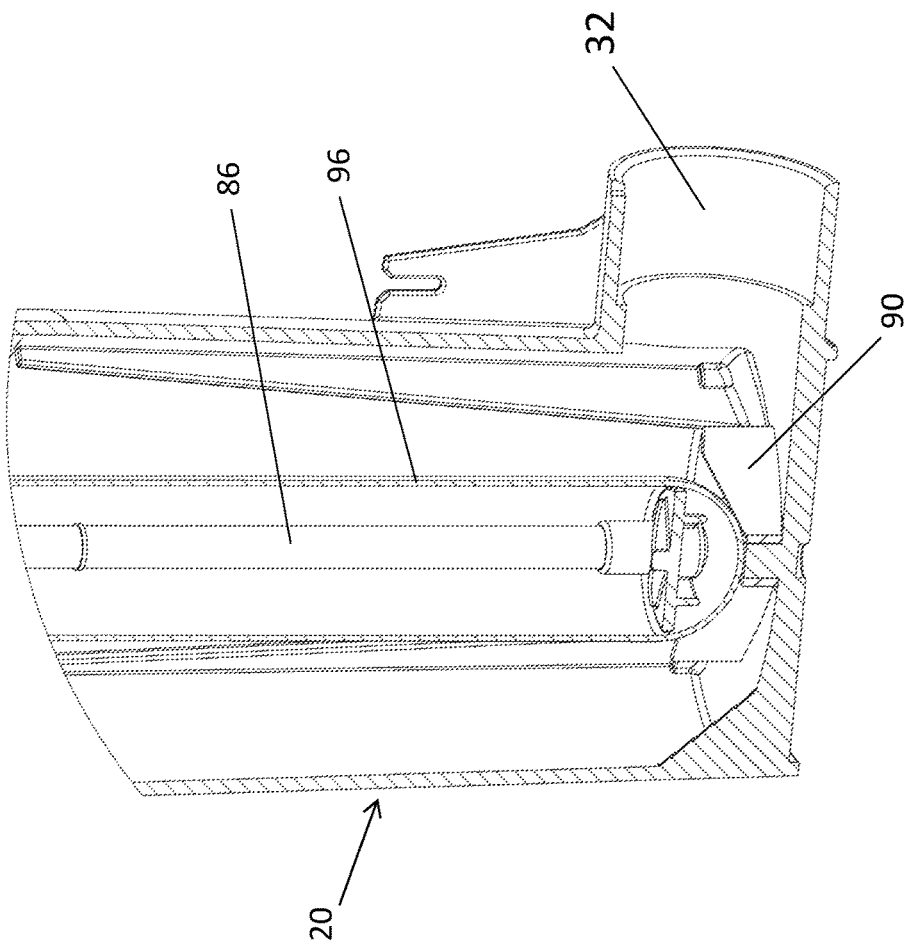
FIG. 7C is a portion of a cross-sectional view of FIG. 7A taken along section lines 7C-7C.
Figure 7B:
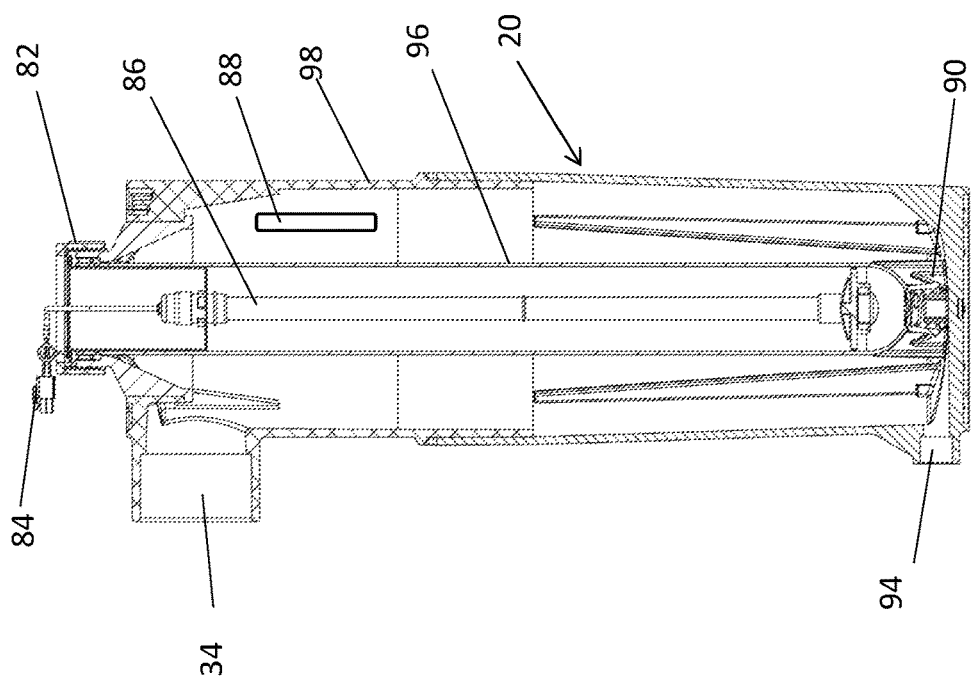
FIG. 7B is a cross-sectional view of FIG. 7A taken along section lines 7B-7B.

The UV reactor chamber 20 of the water sanitizing unit 10, as shown specifically in FIGS. 7A-7C, includes a UV reactor chamber water inlet 32, a UV reactor chamber water outlet 34, a UV chamber cap opening 80, and cap 82, a UV light source 86 electrically connected to the sanitizing unit control center 26 by electrical connection wires 84, an optional UV intensity sensor 88 within the UV reactor chamber 20, and a plurality of water paddle blades 90 extending radially about an axial center of the UV reactor chamber 20 adjacent the UV reactor chamber water inlet 32 and configured to rotate about the axial center of the UV reactor chamber when water enters the UV reactor chamber 20 through the UV reactor chamber water inlet 32. Alternatively, the paddle blades 90 may be rotated by a motor or other powered or automated rotation source. The effectiveness of the UV reactor is partially determined by the length of time the pathogens in the water are exposed to the UV light around the quartz tube 96. Pathogens traveling closer to the UV source 86 will experience a higher dose rate than those farther away. The rotating water paddle blades 90 create a vortex of water around the quartz tube 96 containing the UV light source 86, whether it be a single bulb or a UV lamp array, to ensure all pathogens travel close to the UV light source 86 for a portion of the time in the reactor chamber 20. This creates better mixing efficiency of the reactor resulting in more pathogens being exposed to a higher dose rate.

Conventional UV reactor systems that use both UV and ozone creation for water sanitation place both the UV lamp and the corona discharge in the same enclosure to create ozone within the unit. Sometimes, a combination UV and ozone generating bulb is used within the UV reactor. However, the wavelength of the UV sterilization also reduces ozone making generation of new ozone within the UV reactor. This method is less effective than separate generation. Embodiments of water sanitation units that include an ozone generator 22 in addition to a UV reactor chamber 20 provide the ozone generator 22 with a reactor chamber 54 separate from the UV reactor chamber 20, for example, as illustrated and explained previously herein. In this way, one lamp 50 is used to produce ozone, and a separate lamp system 86 (sometimes an array) is used to produce UV sterilization. In this way, ozone and UV are produced in separate chambers but within the same water sterilization unit.

A conventional UV reactor comprises a UV generating bulb inside a quartz tube. However, conventional quartz tube reactors get hard water build-up over time, causing a cloud to build up on the quartz tube making the system less effective by blocking the radiation from the lamp from irradiating the water. When that happens, the only way to clean the quartz tube in a conventional system is to take the quartz tube apart from the conventional UV reactor to clean it, and there is no warning to the owner that the quartz tube has become cloudy, so the pool owner generally is oblivious to the cloudy state of the UV reactor unless they consider opening the UV reactor to check its state and clean it.

Particular embodiments of a water sterilization unit 10 of the disclosure may include a winterization port or cleaning port 92 through which the owner can flush a cleaning solution such as CLR® into the cleaning port 92 to clean hard water from the quartz tube and UV bulb in the UV reactor chamber 20. FIGS. 7A-7C, illustrate an example of a UV quartz tube 96 in a UV reactor chamber 20 having a top cleaning port 92 and bottom drain 94 for this purpose.

When not in use, the cleaning port 92 and drain port 94 are plugged, such as with a threaded plug, or otherwise isolated from external inputs to the system. A hand or foot pump may be used to pump the cleaning solution into the bottom drain port 94 and have it exit through the top cleaning port 92. In particular embodiments, a standard garden hose with an adapter having a bypass for cleaning solution to be added may be used so that when water is flowing through the hose it draws in cleaning solution to clean the quartz tube 96 without any disassembly of the unit to isolate the quartz tube.

For conventional UV reactors, as a UV lamp ages, its intensity drops and causes the UV lamp to become less effective. Thus, for conventional UV reactors, a pool owner is required to calculate the predicted hours for the effective life of the bulb, hope that the bulb's effective life is close to the predicted hours, and then change the bulb at some time before the lamp's effectiveness drops below an acceptable level. Because looking at the bulb itself cannot tell you how effective it is in generating UV light, there really is no way to know the best time to change the bulb unless the bulb burns out. In particular embodiments of a water sanitation system 10, a UV intensity sensor 88 is placed within the UV reactor chamber 20 at the inner surface 98 of the outermost wall to measure the intensity of the UV light being emitted through the quartz tube 96.

FIG. 7B illustrates a non-limiting example of a quartz tube 96 with a UV light source 86 and UV intensity sensor 88 on a wall 98 of the UV reactor chamber 20. By measuring the UV intensity of the UV light being emitted by the quartz tube 96, a system can identify when the amount of UV generated is below a threshold of desired UV generation to then indicate that the quartz tube 96 needs to be cleaned or the UV bulb 86 needs to be replaced. By measuring the UV intensity and its change over time, the system in some embodiments may indicate the time until the next cleaning or bulb replacement. A digital display 100, in operable communication with the sanitation unit control center 26, on a visible surface of the unit 10 may indicate how many hours or % of life is left in the effective life of the UV bulb. A typical UV bulb has 13,000-16,000 hours. In particular embodiments, the system may simply provide a count-down from the expected life of the bulb, as set by the user, rather than using a UV sensor and calculating an estimated remaining effective life. In particular embodiments, the water sanitation unit 10 may be configured with aa Bluetooth, Wi-Fi or wireless transmitter or transceiver, operatively coupled to or incorporated into the sanitizing unit control center 26, adapted to transmit a notice to the system owner or service technician, such as through email or through an app on the owner's smart phone, to provide not only bulb life but also other performance and status data, and, in some embodiments, the ability to activate the water sanitation unit or change its settings.

FIG. 7A also illustrates an off-gassing valve. When some of the remaining air bubbles containing ozone don't fully react in the UV reactor to create hydroxyl radicals, the air bubbles contacting ozone can build up in the chamber which disrupts the effectiveness of the UV light as discussed above where too many bubbles that contain ozone are in the UV reactor chamber 20. By providing a gas pressure relief valve 102, such as a float valve in the UV reactor chamber 20, the excess air containing ozone is allowed to escape through the gas pressure relief valve 102 and allow the UV light to sanitize more effectively. In addition to allowing the UV to sanitize more effectively, a gas pressure relief valve cuts down on air bubbles containing ozone traveling through the system plumbing and causing noise. In some cases the air bubbles containing ozone can make it to the pool causing a potential health hazard in an indoor pool where ozone levels could build up to a unsafe level. Although it is not required, particular embodiments include an off-gassing valve 102.

Those of ordinary skill in the swimming pool water sanitation art will readily understand the relative amounts of chlorine, ozone and UV that are optimal for obtaining the most effective water sanitation for a given system. This knowledge and understanding in combination with the systems, features and embodiments disclosed herein will allow those of ordinary skill in the art to apply the principles disclosed herein to a wide variety of swimming pools and water sanitation systems.

It will be understood that implementations are not limited to the specific components disclosed herein, as virtually any components consistent with the intended operation of a method and/or system implementation for UV reactors, chlorine generators/feeders, ozone generators, diverters and water sanitation units may be utilized. Accordingly, for example, although particular embodiments and material types may be disclosed, such components may comprise any shape, size, style, type, model, version, class, grade, measurement, concentration, material, weight, quantity, and/or the like consistent with the intended operation of a method and/or system implementation may be used. In places where the description above refers to particular embodiments of water sanitation units, features and components, it should be readily apparent that a number of modifications may be made without departing from the spirit thereof and that these implementations may be applied to other water sanitation units.

This disclosure, its aspects and implementations, are not limited to the specific components or assembly procedures disclosed herein. Many additional components and assembly procedures known in the art consistent with the intended water sanitizing units and methods of assembling a water sanitizing unit will become apparent for use with implementations of the apparatus and methods in this disclosure. In places where the description above refers to particular implementations of water sanitizing units, it should be readily apparent that a number of modifications may be made without departing from the spirit thereof and that these implementations may be applied to other water sanitizing units. The presently disclosed implementations are, therefore, to be considered in all respects as illustrative and not restrictive, the scope of the disclosure being indicated by the appended claims rather than the foregoing description. All changes that come within the meaning of and range of equivalency of the description are intended to be embraced therein.

What is claimed is:

1. A swimming pool water sanitizing unit comprising:
   a pool water inlet and a pool water outlet extending from a sanitizing unit housing;
   a sanitizing unit control center on or within the sanitizing unit housing;
   an ozone generator within the sanitizing unit housing and comprising an outer casing, an ozone generator chamber configured to receive a first ultraviolet (UV) light source within the ozone generator chamber and to generate ozone enriched fluid and output the ozone enriched fluid through an ozone output of the ozone generator chamber, the ozone generator chamber surrounded by a plurality of heat sink fins extending from the ozone generator chamber, and a water jacket gap between the ozone generator chamber and the outer casing, the water jacket gap fluidly coupled to both an ozone generator water inlet and an ozone generator water outlet, the ozone generator chamber further comprising a first UV intensity sensor within the ozone generator chamber, the first UV intensity sensor configured to send first UV intensity data to the sanitizing unit control center to indicate when the first UV light source drops below a predetermined first UV intensity level as measured at the first UV intensity sensor;

an UV reactor chamber within the sanitizing unit housing and configured to receive and enclose a second UV light source within the UV reactor chamber, the UV reactor chamber fluidly coupled to both an UV reactor chamber water inlet and an UV reactor chamber water outlet such that fluid flowing through the UV reactor chamber from the UV reactor chamber water inlet to the UV reactor chamber water outlet passes by the second UV light source when the second UV light source is received in the UV reactor chamber, the UV reactor chamber further comprising a second UV intensity sensor within the UV reactor chamber, the second UV intensity sensor configured to send second UV intensity data to the sanitizing unit control center to indicate when the second UV light source drops below a predetermined second UV intensity level as measured at the second UV intensity sensor, the UV reactor chamber further comprising a plurality of water paddle blades extending radially about an axial center of the UV reactor chamber adjacent the UV reactor chamber water inlet and configured to rotate about the axial center of the UV reactor chamber;

an ozone injector within the sanitizing unit housing and fluidly coupled to the ozone output of the ozone generator and to the UV reactor chamber water inlet; and a diverter valve fluidly coupled to the ozone output of the ozone generator and an ozone system output, the diverter valve adjustable to regulate an amount of the ozone enriched fluid diverted from the ozone generator to a suction side of a swimming pool pump.

2. The swimming pool water sanitizing unit of claim 1, further comprising a pressure differential sensor electronically coupled with the sanitizing unit control center, the sanitizing unit control center configured to turn off the sanitizing unit or reduce its power usage when the pressure differential sensor indicates that the water flow through the sanitizing unit is below a predetermined magnitude.

3. The swimming pool water sanitizing unit of claim 1, further comprising a wireless transmitter operatively associated with the sanitizing unit control center, the wireless transmitter configured to transmit a signal to indicate when the first UV light source or the second UV light source is in need of replacement.

4. The swimming pool water sanitizing unit of claim 1, further comprising a wireless transceiver operatively associated with the sanitizing unit control center, the wireless transceiver configured to transmit a signal to indicate when the sanitizing unit is in need of service or to receive a signal to change settings on the sanitizing unit through wireless communication with the sanitizing unit control center.

5. The swimming pool water sanitizing unit of claim 1, wherein the pool water inlet comprises a first inlet arm and a second inlet arm, and wherein the ozone injector comprises a venturi injector fluidly coupled to the ozone output of the ozone generator at a fluid input to the venturi injector, the venturi injector comprising a venturi nozzle coupled between the first inlet arm and the second inlet arm such that the venturi injector extends between the first inlet arm and the second inlet arm and is configured to inject ozone enriched fluid from the ozone generator into the venturi injector as pool water passes between the venturi injector.

6. The swimming pool water sanitizing unit of claim 1, further comprising a chlorine feeder coupled to the pool water inlet.

7. The swimming pool water sanitizing unit of claim 1, wherein the UV reactor chamber further comprises a first cleaning port adjacent a first end of the UV reactor chamber and separate from the UV reactor chamber water inlet, and a second cleaning port adjacent a second end of the UV reactor chamber and separate from the UV reactor chamber outlet, the first and second cleaning ports each comprising a removable plug within them.

8. The swimming pool water sanitizing unit of claim 1, wherein the UV reactor chamber further comprises an off-gassing valve adjacent an end of the UV reactor chamber, the off-gassing valve configured to release gas collected within the UV reactor chamber adjacent the end of the UV reactor chamber.

9. A swimming pool water sanitizing unit comprising:
a pool water inlet and a pool water outlet extending from a sanitizing unit housing;
an ozone generator within the sanitizing unit housing and comprising an outer casing, an ozone generator chamber configured to receive an ozone source within the ozone generator chamber and to generate ozone enriched fluid and output the ozone enriched fluid through an ozone output of the ozone generator chamber;
an ultraviolet (UV) reactor chamber within the sanitizing unit housing and configured to receive and enclose an UV light source within the UV reactor chamber, the UV reactor chamber fluidly coupled to both an UV reactor chamber water inlet and an UV reactor chamber water outlet such that fluid flowing through the UV reactor chamber from the UV reactor chamber water inlet to the UV reactor chamber water outlet passes by the UV light source when the UV light source is received in the UV reactor chamber, the UV reactor chamber further comprising a plurality of water paddle blades extending radially about an axial center of the UV reactor chamber adjacent the UV reactor chamber water inlet and configured to rotate about the axial center of the UV reactor chamber; and
an ozone injector within the sanitizing unit housing and fluidly coupled to the ozone output of the ozone generator and the UV reactor chamber water inlet,
wherein the UV reactor chamber is separate from the ozone generator.

10. The swimming pool water sanitizing unit of claim 9, further comprising a diverter valve fluidly coupled to the ozone output of the ozone generator, the ozone injector and an ozone system output, the diverter valve adjustable to regulate an amount of the ozone enriched fluid diverted from the ozone generator to a suction side of a swimming pool pump.

11. The swimming pool water sanitizing unit of claim 9, wherein the ozone source is an ozone generating UV light source, and
further comprising a UV intensity sensor within at least one of the UV reactor chamber and the ozone generator chamber, the UV intensity sensor configured to send UV intensity data to a sanitizing unit control center to indicate when UV intensity within the at least one of the UV reactor chamber and the ozone generator chamber drops below a predetermined UV intensity level as measured at the UV intensity sensor.

12. The swimming pool water sanitizing unit of claim 9, further comprising a pressure differential sensor electronically coupled with a sanitizing unit control center, the sanitizing unit control center configured to turn off the sanitizing unit or reduce its power usage when the pressure differential sensor indicates that the water flow through the sanitizing unit is below a predetermined magnitude.

13. The swimming pool water sanitizing unit of claim 9, further comprising a wireless transmitter operatively associated with a sanitizing unit control center, the wireless transmitter configured to transmit a signal to indicate when the ozone generating light source or the UV light source is in need of replacement.

14. The swimming pool water sanitizing unit of claim 9, further comprising a wireless transmitter operatively associated with a sanitizing unit control center, the wireless transmitter configured to transmit a signal to indicate when the sanitizing unit is in need of service.

15. The swimming pool water sanitizing unit of claim 9, wherein the pool water inlet comprises a first inlet arm and a second inlet arm, and wherein the ozone injector comprises a venturi injector fluidly coupled to the ozone output of the ozone generator at a fluid input to the venturi injector, the venturi injector comprising a venturi nozzle coupled to the first inlet arm and to the second inlet arm such that the venturi injector extends between the first inlet arm and the second inlet arm and is configured to inject ozone enriched fluid from the ozone generator into the venturi injector as pool water passes between the venturi injector.

16. The swimming pool water sanitizing unit of claim 9, wherein the UV reactor chamber further comprises a first cleaning port adjacent a first end of the UV reactor chamber and separate from the UV reactor chamber water inlet, and a second cleaning port adjacent a second end of the UV reactor chamber and separate from the UV reactor chamber outlet, the first and second cleaning ports each comprising a removable plug within them.

17. The swimming pool water sanitizing unit of claim 9, wherein the UV reactor chamber further comprises an off-gassing valve adjacent an end of the UV reactor chamber, the off-gassing valve configured to release gas collected within the UV reactor chamber adjacent the end of the UV reactor chamber.

18. A swimming pool water sanitizing unit comprising:
a pool water inlet and a pool water outlet extending from a sanitizing unit housing;
an ozone generator within the sanitizing unit housing, the ozone generator comprising an ozone generator chamber with an ozone output;
an ultraviolet (UV) reactor chamber within the sanitizing unit housing and configured to receive and enclose an UV light source within the UV reactor chamber, the UV reactor chamber comprising a UV reactor chamber water inlet adjacent a first end of the UV reactor chamber and a UV reactor chamber water outlet adjacent a second end of the UV reactor chamber; and
an ozone injector within the sanitizing unit housing and fluidly coupled to the ozone output, the pool water inlet and the UV reactor chamber water inlet,
wherein the ozone generator further comprises an outer casing and where the ozone generator chamber is configured to receive an ozone source within the ozone generator chamber and to generate ozone enriched fluid and output the ozone enriched fluid through the ozone output of the ozone generator chamber, and
wherein the UV reactor chamber is separate from the ozone generator, the UV reactor chamber fluidly coupled to both the UV reactor chamber water inlet and the UV reactor chamber water outlet such that fluid flowing through the UV reactor chamber from the UV reactor chamber water inlet to the UV reactor chamber water outlet passes by the UV light source when the UV light source is received in the UV reactor chamber.

19. The swimming pool water sanitizing unit of claim 18, further comprising a diverter valve fluidly coupled to the ozone output of the ozone generator, the ozone injector and an ozone system output, the diverter valve adjustable to regulate an amount of the ozone enriched fluid diverted from the ozone generator to a suction side of a swimming pool pump.

20. The swimming pool water sanitizing unit of claim 18, wherein the pool water inlet comprises a first inlet arm and a second inlet arm, and wherein the ozone injector comprises a venturi injector fluidly coupled to the ozone output of the ozone generator at a fluid input to the venturi injector, the venturi injector comprising a venturi nozzle coupled between the first inlet arm and the second inlet arm such that the venturi injector extends between the first inlet arm and the second inlet arm and is configured to inject ozone enriched fluid from the ozone generator into the venturi injector as pool water passes between the venturi injector.

21. The swimming pool water sanitizing unit of claim 18, further comprising a UV intensity sensor within at least one of the UV reactor chamber and the ozone generator chamber, the UV intensity sensor configured to send UV intensity data to a sanitizing unit control center to indicate when UV light intensity drops below a predetermined UV intensity level as measured at the UV intensity sensor.

22. The swimming pool water sanitizing unit of claim 18, the UV reactor chamber further comprising a plurality of water paddle blades extending radially about an axial center of the UV reactor chamber adjacent the UV reactor chamber water inlet and configured to rotate about the axial center of the UV reactor chamber.

23. The swimming pool water sanitizing unit of claim 18, the UV reactor chamber further comprising a first cleaning port adjacent the first end of the UV reactor chamber and separate from the UV reactor chamber water inlet, and a second cleaning port adjacent the second end of the UV reactor chamber and separate from the UV reactor chamber outlet, the first and second cleaning ports each comprising a removable plug within them.

24. A swimming pool water sanitizing unit comprising:
a pool water inlet and a pool water outlet extending from a sanitizing unit housing;
an ozone generator within the sanitizing unit housing, the ozone generator comprising an ozone generator chamber with an ozone output;
an ultraviolet (UV) reactor chamber within the sanitizing unit housing, the UV reactor chamber comprising a UV reactor chamber water inlet adjacent a first end of the UV reactor chamber and a UV reactor chamber water outlet adjacent a second end of the UV reactor chamber;
an ozone injector within the sanitizing unit housing and fluidly coupled to the ozone output, the pool water inlet and the UV reactor chamber water inlet; and
a diverter valve fluidly coupled to the ozone output of the ozone generator, the ozone injector and an ozone system output, the diverter valve adjustable to regulate an amount of the ozone enriched fluid diverted from the ozone generator to a suction side of a swimming pool pump.

25. The swimming pool water sanitizing unit of claim 24, wherein the pool water inlet comprises a first inlet arm and a second inlet arm, and wherein the ozone injector comprises a venturi injector fluidly coupled to the ozone output of the ozone generator at a fluid input to the venturi injector, the venturi injector comprising a venturi nozzle coupled between the first inlet arm and the second inlet arm such that the venturi injector extends between the first inlet arm and the second inlet arm and is configured to inject ozone enriched fluid from the ozone generator into the venturi injector as pool water passes between the venturi injector.

26. The swimming pool water sanitizing unit of claim 24, further comprising a UV intensity sensor within at least one of the UV reactor chamber and the ozone generator chamber, the UV intensity sensor configured to send UV intensity data to a sanitizing unit control center to indicate when UV light intensity drops below a predetermined UV intensity level as measured at the UV intensity sensor.

27. The swimming pool water sanitizing unit of claim 24, the UV reactor chamber further comprising a plurality of water paddle blades extending radially about an axial center of the UV reactor chamber adjacent the UV reactor chamber water inlet and configured to rotate about the axial center of the UV reactor chamber.

28. The swimming pool water sanitizing unit of claim 24, the UV reactor chamber further comprising a first cleaning port adjacent the first end of the UV reactor chamber and separate from the UV reactor chamber water inlet, and a second cleaning port adjacent the second end of the UV reactor chamber and separate from the UV reactor chamber outlet, the first and second cleaning ports each comprising a removable plug within them.

29. A swimming pool water sanitizing unit comprising:
a pool water inlet and a pool water outlet extending from a sanitizing unit housing;
an ozone generator within the sanitizing unit housing, the ozone generator comprising an ozone generator chamber with an ozone output;
an ultraviolet (UV) reactor chamber within the sanitizing unit housing, the UV reactor chamber comprising a UV reactor chamber water inlet adjacent a first end of the UV reactor chamber, a UV reactor chamber water outlet adjacent a second end of the UV reactor chamber, and a plurality of water paddle blades extending radially about an axial center of the UV reactor chamber adjacent the UV reactor chamber water inlet and configured to rotate about the axial center of the UV reactor chamber; and
an ozone injector within the sanitizing unit housing and fluidly coupled to the ozone output, the pool water inlet and the UV reactor chamber water inlet,
wherein the UV reactor chamber is separate from the ozone generator.

30. The swimming pool water sanitizing unit of claim 29, further comprising a diverter valve fluidly coupled to the ozone output of the ozone generator, the ozone injector and an ozone system output, the diverter valve adjustable to regulate an amount of the ozone enriched fluid diverted from the ozone generator to a suction side of a swimming pool pump.

31. The swimming pool water sanitizing unit of claim 29, wherein the pool water inlet comprises a first inlet arm and a second inlet arm, and wherein the ozone injector comprises a venturi injector fluidly coupled to the ozone output of the ozone generator at a fluid input to the venturi injector, the venturi injector comprising a venturi nozzle coupled between the first inlet arm and the second inlet arm such that the venturi injector extends between the first inlet arm and the second inlet arm and is configured to inject ozone enriched fluid from the ozone generator into the venturi injector as pool water passes between the venturi injector.

32. The swimming pool water sanitizing unit of claim 29, further comprising a UV intensity sensor within at least one of the UV reactor chamber and the ozone generator chamber, the UV intensity sensor configured to send UV intensity data to a sanitizing unit control center to indicate when UV light intensity drops below a predetermined UV intensity level as measured at the UV intensity sensor.

33. The swimming pool water sanitizing unit of claim 29, the UV reactor chamber further comprising a first cleaning port adjacent the first end of the UV reactor chamber and separate from the UV reactor chamber water inlet, and a second cleaning port adjacent the second end of the UV reactor chamber and separate from the UV reactor chamber outlet, the first and second cleaning ports each comprising a removable plug within them.

* * * * *